Sept. 28, 1926.
S. PARDA
CHANGEABLE PICTURE FRAME
Filed Oct. 27, 1925
1,601,479
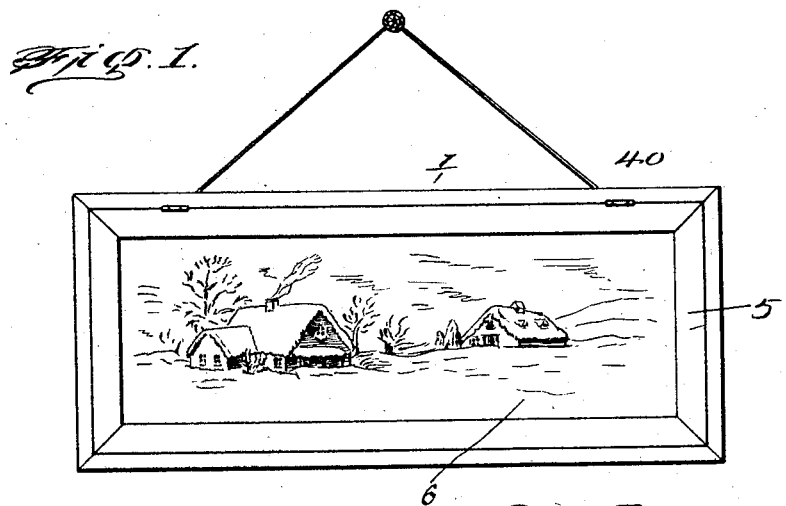
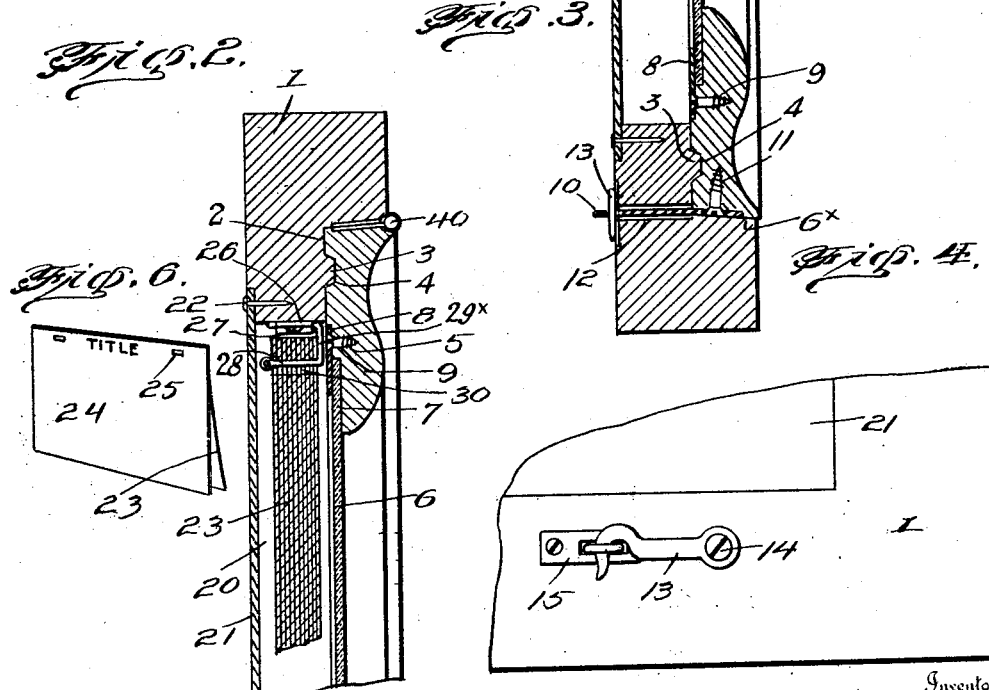
Inventor
Stanley Parda.
By Clarence A. O'Brien
Attorney Patented Sept. 28, 1926.

1,601,479

UNITED STATES PATENT OFFICE.

STANLEY PARDA, OF NEW YORK, N. Y.

CHANGEABLE-PICTURE FRAME.

Application filed October 27, 1925. Serial No. 65,168.

My present invention pertains to picture frames, and it has for one of its objects to provide a changeable picture frame—i. e., a picture frame constructed and arranged in such manner that it is adapted to contain a number of pictures, the subjects of the pictures being varied in the discretion of the manufacturer or merchant marketing the frame, and the pictures being shiftable so that any desired picture may be displayed.

Another object of the invention is the provision of a picture frame which by virtue of its construction is dust proof.

Another object of the invention is the provision in a picture frame of simple and efficient means for the holding of a plurality of pictures in such a manner that while there is no liability whatever of accidental displacement yet when desired any one of the plurality of pictures may be opposed to the glass of the frame for display therethrough.

To the attainment of the foregoing, the invention consists in the improvement as hereinafter described and definitely claimed.

In the accompanying drawings, forming part of this specification:—

Figure 1 is a front elevation showing a picture frame constructed in accordance with my invention and as hung in conventional manner.

Figure 2 is an enlarged fragmentary vertical section of the upper portion of the frame, the same being shown as closed.

Figure 3 is a fragmentary vertical section showing the lower portion of the frame.

Figure 4 is a detail rear elevation showing a portion of the rear of the picture frame to make clear the preferred fastener complementary thereto.

Figure 5 is an enlarged perspective showing the means for detachably holding a plurality of pictures in tablet form.

Figure 6 is a perspective showing one of the pictures that I prefer to employ.

Similar numerals of reference designate corresponding parts in all of the views of the drawings.

The main frame 1 of the improvement is rabbeted as designated by 2 in its face, and is provided with a rib 3, the latter being adapted to seat in a corresponding recess 4 extending about the opening in a glass carrying frame 5, and being designed with the projection 3 to break joints so as to render my improvement practically dust proof. It will also be noticed that the main frame 1 and the glass carrying frame 5 have the opposed beveled surfaces 6$^x$ which provision also contributes to the exclusion of dust when the glass carrying frame 5 is closed. The glass in said frame 5 is designated by 6, and it is arranged in a rabbet 7 of frame 5, and is preferably secured to frame 5 by an open frame 8 and screws 9, as shown. For the fastening of the frame 5 in closed position without detracting in any measure from the finished appearance of the front of the picture, I provide the fastening means clearly shown in Figures 3 and 4. The said means comprises an eye 10, connected at 11 to the glass carrying frame 5, and extending through an aperture 12 in the main frame 1. Said fastener also comprises a hook 13, pivoted at 14 on the back of the main frame 1. When deemed expedient a wear plate 15 may be provided on the back of the main frame 1, about the aperture 12, and in opposed relation to the hook 13 so as to prevent the latter from marring the back of the frame 1. I would also have it here understood that in the preferred embodiment of my invention a plurality of fasteners such as described will be employed.

The back of the space 20 in the main frame 1 may be closed in any manner compatible with the purpose of my invention, a plate 21 being shown for said purpose, and said plate 21 being connected at 22 to the back of the main frame 1.

A plurality of pictures 23 is shown in the space 20 of the main frame 1. In the preferred embodiment of my invention each of the said pictures 23 is provided at its back with a sheet 24, of blotting paper, the said sheet 24 being appropriately attached to the picture 23 along the upper edges of the two, and the two thicknesses having apertures 25.

It will be readily understood from the drawings, that I prefer in practice to employ a plurality of devices in the space 20 for the retention of the plurality of pictures in a compact tablet form. One of the said devices is clearly shown in Figures 2 and 5, and a detailed description of said device will suffice to impart a definite understanding of all of the devices employed. By particular reference to Figure 2, it will be noted that a keeper 26 is connected at 27 to the top wall of the space 20; also, that said keeper 26 is by preference open at its opposite ends. In association with the said keeper 26 I employ a holder 28, preferably of metal, which includes an arm 29 for insertion into the keeper 26 from the front when the glass carrying frame 5 is open, a vertically disposed body portion 29*, and a lower arm 30, said arm 30 having an eye 31, designed after the arm 30 is passed through one of the apertures 25 of the pictures 23, to receive a pin 32, best shown in Figure 5. The said pin 32 is preferably provided with a stop 33 Figure 5, to limit the movement of the pin in the eye 31, and the pin is also provided with an arm 34 adapted in the use of the pin as shown in Figure 5 to rest against the upper edges of the plurality of pictures shown.

As will be apparent from the foregoing my improvement lends itself to the display of a plurality of pictures in succession, all of the pictures, however, being preserved in a dust proof container during all of the time that the foremost picture is displayed through the glass 6. When it is desired to present a fresh picture to the glass 6, it is simply necessary for a person in authority to unfasten and open the frame 5, and then withdraw the packet of pictures and the holders from the frame 1. With this done, the pins 32 are withdrawn, and the pictures are removed from the holders and the pictures are manipulated so as to place foremost the picture desired, after which the holders are again connected and fastened to the plurality of pictures, and the pictures and holders are replaced in the frame 1 and the glass carrying frame 5 is closed whereupon the picture will present the appearance shown in Figure 1, and hence will not differ in appearance from an ordinary picture, many ordinary pictures having hinges 40 similar to those which I employ, by preference, for the hinge connection of the glass carrying frame 5 to the main frame 1.

In practice, seasonal pictures may be employed in my improvement, and on the arrival of a particular season a picture appropriate to the season may be displayed. Again if the plurality of pictures includes the pictures of men famous in the history of the country, changes may be made for the display of the picture of each patriot or statesman on or shortly before his birthday.

Notwithstanding the capacity of function ascribed to my novel picture frame, and the practical advantages of the said frame in general, it will be appreciated that the construction of the frame as a whole is inexpensive, and is free of delicate parts such as are likely to get out of order after short period of use.

An important factor of my invention resides in the fact that notwithstanding the changeable character of my improvement, the improvement aside from the plurality of pictures employed is but slightly more expensive than an ordinary picture frame.

I have specifically described the construction and relative arrangement of the parts embraced in the present and preferred embodiment of my invention in order to impart a full, clear and exact understanding of the said embodiment. I do not desire, however, to be understood as confining myself to the specific structure disclosed, my invention being defined by my subjoined claims within the scope of which changes in structure and in relative arrangement of parts may be made without departure from my invention.

Having described my invention, what I claim and desire to secure by Letters-Patent, is:—

1. A picture frame comprising a main frame having an opening and also having in its face about said opening a rabbet, a glass carrying frame hingedly connected to the main frame and moved into and out of said rabbet, said main frame and glass carrying frame also having opposed beveled surfaces, means in the said rabbets for breaking joints between the main frame and the glass carrying frame, fastening means on the glass carrying frame and extending through the main frame to the back of the latter, and means on the back of the main frame for cooperating with said fastening means and detachably holding the glass carrying frame in the rabbet of the main frame.

2. In combination, a frame, a keeper carried by the frame, a plurality of apertured pictures, and a holder for detachably retaining said pictures; said holder having means for its detachable connection to said keeper and also having an apertured arm extending through the apertures of the pictures and a pin extending through the said aperture of the arm and having an angularly disposed portion opposed to edges of the pictures.

3. A changeable picture frame comprising an open main frame closed at one side, a movable glass carrying frame connected with the main frame at the opposite side thereof, a plurality of apertured pictures, one in front of the other removably arranged in the main frame and back of the glass carrying frame, and means in the main frame for detachably connecting the pictures therewith and suspending the pictures in the main frame; said means comprising keepers in the main frame and carried by the upper part thereof, devices having arms for detachable connection with said keepers and also having apertured arms removably arranged in the apertures of the pictures, and pins disposed in the apertures of said arms and at the back of the pictures and having angular portions superposed on edges of some of the pictures.

In testimony whereof I affix my signature.

STANLEY PARDA.